Sept. 15, 1953 R. E. BROCKMAN 2,651,875
ICE FISHING TIP-UP
Filed Oct. 20, 1949

Inventor
RAY E. BROCKMAN
By
Wheeler, Wheeler & Wheeler
Attorneys

Patented Sept. 15, 1953

2,651,875

UNITED STATES PATENT OFFICE 2,651,875

ICE FISHING TIP-UP

Ray E. Brockman, Chicago, Ill., assignor to Frabill Manufacturing Company, Milwaukee, Wis., a corporation of Wisconsin Application October 20, 1949, Serial No. 122,519

4 Claims. (Cl. 43—17)

This invention relates to improvements in ice fishing tip ups.

It is the principal object of the invention to provide a tip up of the type used in fishing through the ice having an improved structural arrangement whereby the tip up may be quickly and conveniently positioned over a hole in the ice and which incorporates an improved strike indicator releasing mechanism.

Another object of the invention is to provide such an improved tip up wherein the parts are so constructed and arranged as to be readily foldable for ease in transportation.

Another object of the invention is to provide in such an improved tip up a non-freeze trigger release mechanism providing two way strike indicator release action.

It is a further object of the invention to accomplish the above objects in a compact foldable structure admitting of mass production manufacture, and which may be largely made of light and inexpensive material, such as waterproofed wood or the like.

Other objects will be more apparent to one skilled in the art upon an examination of the following disclosure.

Figures 1, 2, 3, 4:
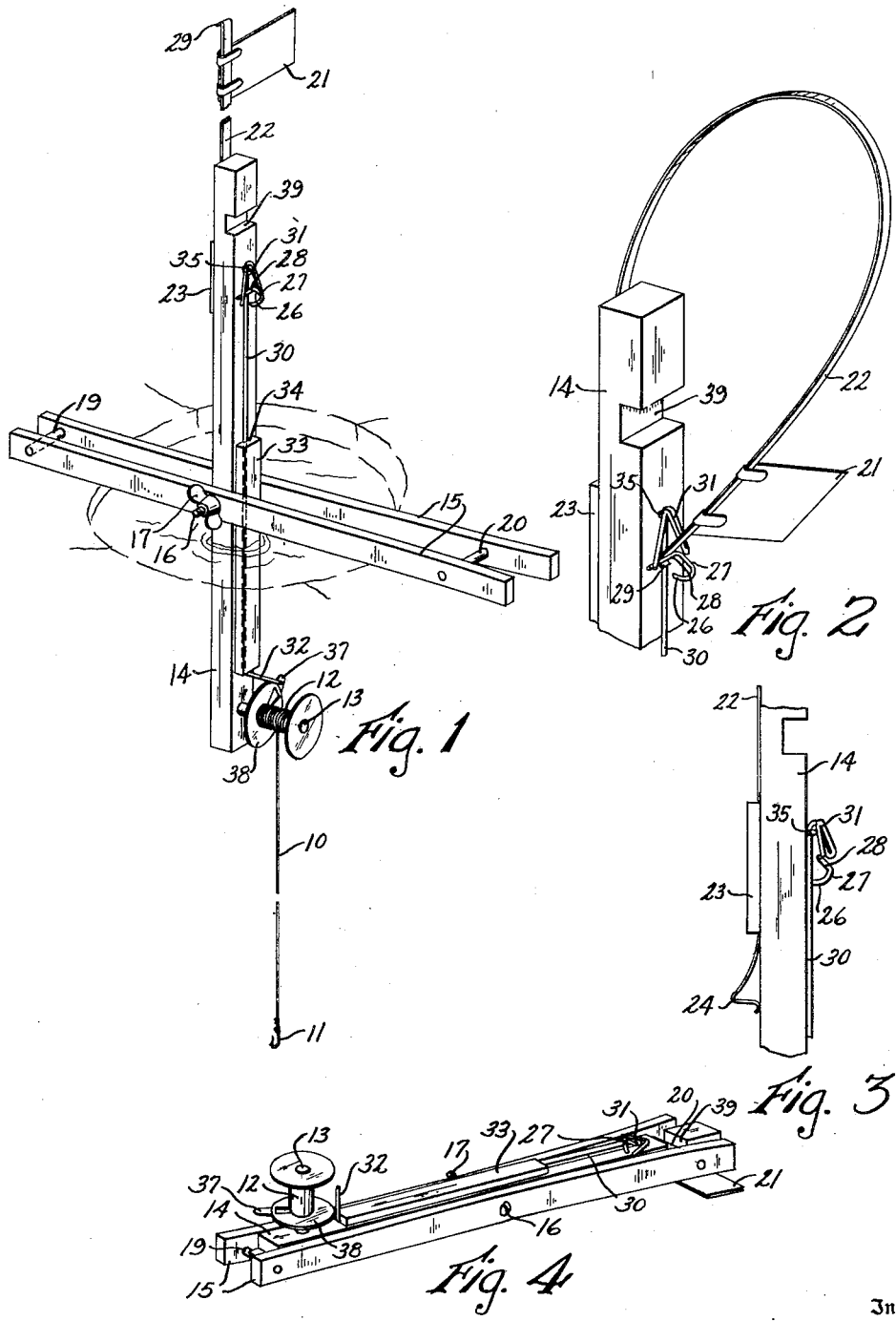
Fig. 1 is a perspective view of the improved fishing tip up shown operatively positioned over a hole in the ice.
Fig. 2 is a fragmentary perspective view of the upper portion of the tip up showing the details of the strike indicator and release trigger mechanism.
Fig. 3 is a view in fragmentary side elevation further showing the details of the strike indicator release trigger mechanism.
Fig. 4 is a view in perspective showing the improved tip up folded for transportation.

Ice fishing tip ups are employed for the dual purpose of anchoring the fish line and for indicating a strike to the fisherman. The tip ups are used in connection with holes cut through the ice. Several of such holes may be cut and a fishing tip up may be positioned at each of said holes. In this manner one fisherman can control several fish lines and will be appraised by the tip up indicating mechanism of a strike occurring at any of such lines.

With particular reference to Fig. 1, a fish line 10 carrying a hook 11 is shown wound upon a spool 12 which extends transversely on its axis 13 from the lower portion of upright member 14. The member 14 is supported in an upright position through a hole in the ice by the spaced spanner members 15 which span the ice hold and carry the upright member 14 in the space therebetween in pivoted suspension on bolt 16. A wing nut 17 is provided to cooperate with the bolt 16 to frictionally bind the upright 14 and spanning members 15 in operative relation. The normally transverse support members 15 are held in spaced apart relation by the stretchers 19 and 20 which are of such a length as to diverge the outer ends of members 15 slightly from the center pivot bolt 16.

In the operative position of the tip up shown in Fig. 1 it is observed that the lower portion of the upright member 14 projects downwardly into the water and that its upper portion projects above the water to a height visible for a considerable distance from the ice hole. The upper portion of the upright member 14 carries an indicator flag 21 which is secured to the free end of a flat spring 22. This spring is adjustably secured to the upright member 14 through a longitudinally channeled slideway 23. At its end remote from the flag the spring 22 is provided with an inclined wedge portion 24. The spring 22 is slidable longitudinally within the channeled slideway 23 from its normally extended position shown in Figures 1–3 to a retracted position shown in Fig. 4. When the spring is extended, the offset wedge end 24 binds between the upright 14 and the slideway 23 to maintain the indicator spring in extended position.

The upper end of the upright 14, preferably at a side portion opposite from the slideway 23, is provided with a detent, indicated generally as 27, which comprises a fixed rail 28 transversely disposed with respect to the upright member and supported in an inwardly unobstructed or offset spaced relationship with respect to the upright on a downwardly curved leg 26 driven into the upright. The spacing of the rail 28 from the upright is best shown in Fig. 3. The end of spring 22 is provided with a hook 29 which is adapted for engagement with the detent rail 28 when the spring is looped downwardly as shown in Fig. 2.

For the release of the indicator spring responsive to a fish strike, the upright 14 is further provided with a hook releasing trigger mechanism. This comprises a rod 30 disposed longitudinally of the upright and having an upper forked trigger 31 and a lower end carrying a crank 32. The trigger 31 is so disposed with respect to the detent and the hook 29 of the spring 22 as to normally guide the hook 29 between its forked arms. Axial rotation of the rod 30 will rock the work with resulting cam action so as to force the hooked end 29 of the spring transversely over the end of detent rail 28, thereby releasing the hook from the detent and permitting the spring to whip the flag to a prominent upright position. The inwardly unobstructed arrangement of the detent rail 28 and engaged spring hook 29 permits the release of the hook over either end of the rail, thereby providing for actuation of the indicator regardless of the direction of rotation of the trigger rod 30.

The upper end of the trigger rod 30 is positioned proximate the detent through eye 35. The lower portion of the trigger rod, which is normally immersed in the water, is laterally supported in a longitudinally channeled block 33. The guideway 34, comprising the clearance space between the upright 14 and the channeled block 33, is desirably filled with a water proof lubricant which will not become too viscous at temperatures prevalent at ice fishing time. Such a substance is to be found in a low freezing temperature lubricant. In this manner the rod is isolated from contact with the water and the danger of the rod freezing fast to the upright is obviated.

Spool 12 carries a striker 37 on its inner flange 38 which is engageable, upon spool rotation, with the crank 32. A tug on the line 10 causing rotation of the spool 12 will contact the striker 37 with the crank 32 thereby transmitting a rocking motion to the rod 30 and actuating the fork 31 so as to release the hooked end of the flag indicator from the detent rail 28. The arrangement is such that rotation of the spool in either direction will be effective to release the indicator and it will be immaterial in which direction the line 10 is wound upon the spool 12.

The end of the line remote from the hook 11 is securely attached to the spool so that the fish is held even if all the line is unwound. The release of the flag indicator will draw the attention of the fisherman to the tip up whereupon the fisherman may draw in the line with the fish.

In order to facilitate the folding of the spanner members 15 against the upright 14, the upright is provided near its upper end with a transverse groove 39 opened outwardly at each side of the upright. Stretcher 20 is positioned the same distance from the bolt 16 as is the groove 39 so that upon folding the stretcher into parallelism with the upright, the stretcher 20 will be received within the groove 39. The distance of stretcher 19 from the bolt 16 is slightly greater than the distance from said bolt to the lower projecting end of the upright 14, so that such stretcher will be slightly beyond the lower end of the upright when folded. This folded arrangement, as best shown in Fig. 4, provides for a very compact and easily handled assembly and it is evident that a relatively large number of the folded tip ups can be transported with ease in a small space.

From the foregoing description taken in connection with the accompanying drawings it may be seen that an improved compact and foldable fishing tip up is provided which has an organization and arrangement of parts which admits of fabrication out of wooden or other similar inexpensive materials. Furthermore the tip up incorporates an improved trigger mechanism which is operable in either direction for releasing a flag indicator.

I claim:

1. In a device of the character described an upright having a fishing apparatus at its lower end, a retractable signal apparatus at its upper end including a fixed rail mounted on said upright in an inwardly unobstructed spaced relation with respect thereto in such a position as to hold the signal apparatus in a retracted position, a signal spring having a hook formed at one end which is adapted to detachably engage said rail, and a rod pivotally mounted on said upright, said rod having a forked trigger formed at one of its ends and said trigger being positioned to embrace the hook to rockably displace it from either end of the rail in response to movement of the fishing apparatus.

2. In a fishing tip up the combination with an upright member having a support member upon which said upright is mounted so as to project partly into the water through a hole in the ice and being further provided with an indicator spring having a hook at its upper end and an actuator at its water immersed end, of a detent mounted at a side of the upper portion of the upright for receiving the hook of the spring when said spring is biased against its natural resiliency, said detent comprising a rail and a mounting on which the rail is bodily offset from the upright member and has its ends exposed for release of the spring hook along the rail over either end, a trigger mechanism having a rod between the detent and the upright member and a mounting on which the rod is rockable on its axis, a hook releasing portion on the rod proximate the detent and engageable with the spring hook, and motion transmitting connections between said rod and said actuator for receiving motion from said actuator, whereby said trigger hook is rocked to cause said spring hook to be released from said detent whereupon the spring indicator will resiliently return to a normally released position.

3. The device of claim 2 wherein said trigger rod is further provided at its end proximate the actuator with a crank comprising one of the said motion transmitting connections, and wherein the actuator comprises a spool having an axle mounted at the lower end of the upright member and on the same side thereof as the detent and adapted to receive a fish line in wound relation thereon, said spool having a striker adapted to engage said crank to impart rocking motion to said rod upon rotation of the spool resultant from the unwinding of said fish line.

4. In a fishing tip up the combination with an ice hole spanner comprising spaced support members and a normally upright member pivotally supported between said spaced members and foldable into substantial parallelism with said support members, said upright being provided with a spring indicator carried at its upper end, said spring having a hook at its upper end and being longitudinally adjustable with respect to said upright, said upright being supported on said spanner members for projection above and below the ice, of a detent mounted in offset spaced relation near and at one side of the upper end of said upright member and engageable with the hooked end of said spring indicator when said spring is looped downwardly against its resilient bias, a trigger mechanism comprising a rod disposed longitudinally of said upright member between said member and said detent and having a forked hook proximate said detent to embrace the said spring end to cause the hooked end of the spring to be released from the detent upon rocking motion of said rod in either direction, said rod being further provided at its end operatively disposed below the ice level with a crank, said upright member being provided with a longitudinally channeled guideway extending above and below the normal intersection of said upright with the water level, said trigger rod being laterally confined and rockable on its longitudinal axis within said channel, said channel being substantially filled by said rod and a low freezing temperature lubricant, said upright being further provided below said guideway and proximate the trigger crank with a spool having a mounting axle on the same side of the upright member as the detent and carrying a fish line wound thereon and having a striker engageable with said crank upon substantial rotation of said spool resultant from the unwinding of said fish line to rock said rod on its longitudinal axis.

RAY E. BROCKMAN.

References Cited in the file of this patent

UNITED STATES PATENTS

| Number | Name | Date |
|---|---|---|
| 2,089,097 | Millett | Aug. 3, 1937 |
| 2,225,114 | Hoskins | Dec. 17, 1940 |
| 2,269,777 | Lund | Jan. 13, 1942 |
| 2,448,346 | Baugh et al. | Aug. 31, 1948 |
| 2,502,231 | Oberg | Mar. 28, 1950 |
| 2,518,517 | Baulski | Aug. 15, 1950 |
| 2,565,379 | Laurila | Aug. 21, 1951 |